United States Patent
Lee et al.

[11] Patent Number: 6,056,279
[45] Date of Patent: May 2, 2000

[54] DUO-PUMPING HYDRAULIC MOUNT

[75] Inventors: Chiung Alex Lee, Centerville; Richard Edward Longhouse, Dayton; Daniel Edward Ferris, II, Cincinnati; Mark Wayne Long, Bellbrook, all of Ohio

[73] Assignee: General Motors Corporation, Detroit, Mich.

[21] Appl. No.: 09/069,899

[22] Filed: Apr. 30, 1998

[51] Int. Cl.[7] ................................................ F16F 15/04
[52] U.S. Cl. ........................ 267/140.13; 248/638; 180/300
[58] Field of Search .................................... 180/300, 312; 248/550, 562, 634, 636, 638; 267/3, 140.11, 140.13, 141.1, 219

[56] References Cited

U.S. PATENT DOCUMENTS

| | | | |
|---|---|---|---|
| 4,159,091 | 6/1979 | Le Salver et al. ........................ | 248/562 |
| 4,161,304 | 7/1979 | Brenner et al. ........................... | 248/562 |
| 4,288,063 | 9/1981 | Brenner et al. ........................... | 248/562 |
| 4,773,634 | 9/1988 | Hamaekers ................................ | 267/219 |
| 5,219,430 | 6/1993 | Autoine ................................ | 267/140.12 |
| 5,318,156 | 6/1994 | Davis ........................................ | 188/298 |
| 5,332,203 | 7/1994 | Gossman et al. ................... | 267/140.15 |
| 5,344,127 | 9/1994 | Hettler et al. ........................ | 267/140.13 |
| 5,492,312 | 2/1996 | Carlson ................................ | 267/140.14 |
| 5,645,138 | 7/1997 | Tajima et al. ........................... | 180/300 |

*Primary Examiner*—Chris Schwartz
*Attorney, Agent, or Firm*—Robert M. Sigler

[57] ABSTRACT

In a duo-pumping hydraulic mount, two acting pistons are employed, one associated with each working chamber. The pistons are rigidly connected. During operation, internal pressures generated in each chamber are opposite in sign with one being negative and the other being positive. Therefore, to achieve a given pressure differential across the fluid track, the magnitude of the pressure in each working chamber is half what would be experienced in a conventional single pumping mount. Durability is improved by reducing internal pressures and by distributing kinetic loads to two rubber elements so that individual stresses are minimized. An individual load bearing element supports static loads on the mount.

11 Claims, 4 Drawing Sheets

DUO-PUMPING HYDRAULIC MOUNT

TECHNICAL FIELD

The present invention relates to a duo-pumping hydraulic mount and more particularly, to a hydraulic powertrain mount for a vehicle that uses two working chambers connected in series, where the internal pressure in each chamber is substantially equal in magnitude and opposite in sign.

BACKGROUND OF THE INVENTION

Conventional powertrain mounts exist in many varieties and generally operate to provide engine isolation while concurrently controlling engine motion. The typical hydraulic mount includes a pumping chamber surrounded by relatively thick elastomeric walls with an orifice track opening to the chamber and extending to a reservoir that is typically surrounded by a highly flexible rubber diaphragm. The reservoir is typically located on the opposite side of a partition from the pumping chamber. During compression operation, fluid is pressurized in the pumping chamber and is caused to flow through the orifice track to the reservoir. During rebound operation, fluid is drawn back to the pumping chamber from the reservoir by operation of the pumping chamber. The geometry of the pumping chamber, orifice track and reservoir are tuned so that the fluid in the orifice track resonates at certain frequencies. This is used to provide a peak damping effect at a selected frequency to reduce vehicle harshness from road induced vibrations.

Hydraulic mounts have been in widespread use for some time and their operation is desirable in many applications. Accordingly, new variations for use in additional applications and variations that provide advantages are continuously being sought. One of the essential characteristics of a mount design is that it is durable over an extended life in a severe application environment where high loads are imposed on the mount, developing high internal pressures and high stresses. Therefore, the construction of the hydraulic mount is important. A sufficiently durable mount must perform the functions of locating and supporting the weight of the vehicle's engine while providing adequate isolation. The static load on the mount must be supported for long periods. Static loads place stresses on the bonding between rubber and metal components, and may cause a mount to sag after extended periods. Accordingly, durability improvements are advantageous.

SUMMARY OF THE INVENTION

An aspect of the present invention is to provide a hydraulic engine mount with improved durability. Rather than bulking-up the components of the mount, the present invention utilizes a duo-pumping arrangement that has two working chambers connected in series through a fluid track. Two acting pistons are employed so that one is associated with each working chamber. The pistons are rigidly connected together. Internal pressures generated in each chamber are opposite in sign meaning that one is negative and the other is positive. Therefore, to achieve a given pressure differential across the fluid track, the magnitude of the pressure in each working chamber is half what would be experienced in a conventional single pumping mount. This means that durability is improved by reducing internal pressures and by distributing kinetic loads to two rubber elements so that individual stresses are minimized. Preferably, the duo-pumping mount uses an individual load bearing element for supporting static loads on the mount.

According to a preferred embodiment of the present invention as described in greater detail herein, a hydraulic mount includes a first piston and a wall, with a first working chamber defined between the first piston and the wall. The first piston is supported by a first elastomeric element so that the first working chamber is enclosed. The size of the first working chamber varies as the first elastomeric element is compressed and expanded by operation of the first piston and the wall moving closer together and farther apart. A second piston helps define a second working chamber between the second piston and the wall. The second piston is supported by a second elastomeric element so that the second working chamber is enclosed. The size of the second working chamber varies as the second elastomeric element is compressed and expanded by operation of the second piston and the wall moving closer together and farther apart. A fluid track extends through the wall and opens between the first working chamber and the second working chamber. A fluid is contained in the first working chamber, the second working chamber and the first fluid track. A support engages the wall and a load bearing element extends between the second piston and the support, supporting the first piston and the second piston on the support so that the first resilient element and the second resilient element do not support static loads placed on the hydraulic mount.

DESCRIPTION OF THE PREFERRED EMBODIMENT

Figure 1:
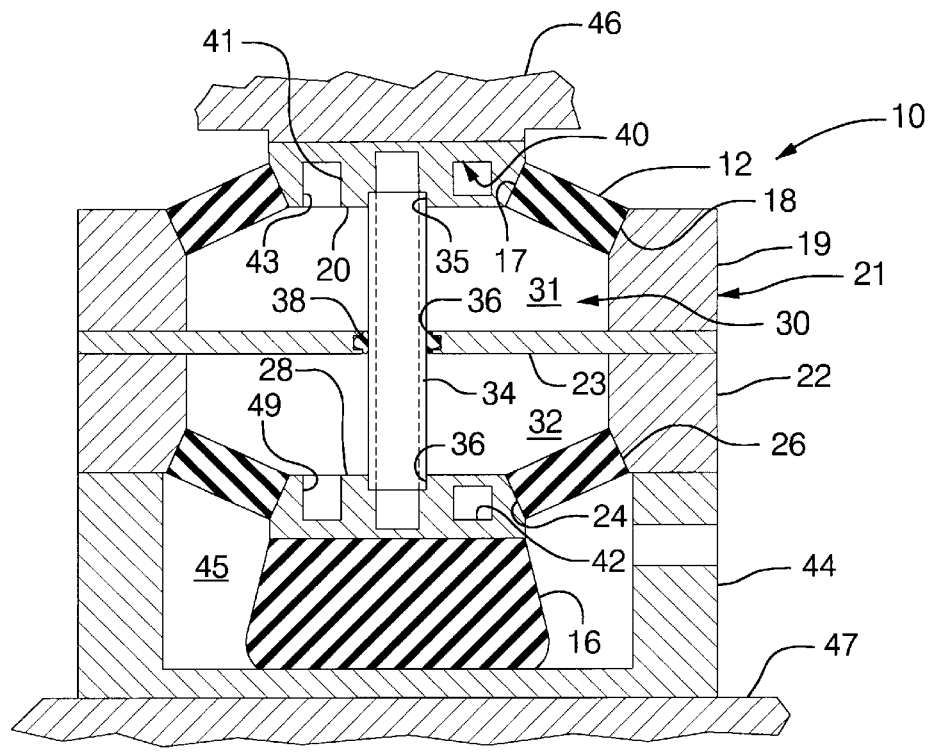
FIG. 1 is a schematic cross-sectional illustration of a hydraulic mount according to the present invention.

Referring to the drawings, illustrated in FIG. 1 is a hydraulic powertrain mount 10. In general, the hydraulic mount 10 is intended to be employed in supporting vehicular powertrain components while reducing the transmission of vibrations between the powertrain and a vehicle body structure. Hydraulic mount 10 includes three rubber bodies designated as elastomeric elements 12, 14 and 16, that provide desirable performance characteristics selected for a given application wherein the elastomeric elements 12, 14 and 16 exhibit a certain resiliency and hardness. The amount of resiliency provided determines certain attenuation properties of the hydraulic mount 10.

Generally, elastomeric element 12 is provided in an annular configuration, although the shape can be varied as desired and as dictated by the packaging requirements placed on the mount. Elastomeric element 12 comprises a wall that is set at an angle so that it diverges from the central vertical axis of the mount 10 from end 17 to end 18, and is generally provided in the form of a truncated hollow cone. The end 17 of elastomeric element 12 is molded, bonded or otherwise secured to a rigid metal piston 20, and the end 18 is similarly connected to section 19 of peripheral wall 21. The peripheral wall 21 includes a section 19 and a section 22 that are fastened to one another clamping the perimeter of partition wall 23 between them. Elastomeric element 14 comprises a wall that is set at an angle so that it diverges from the central vertical axis of the mount 10 from end 24 to end 26, and is generally provided in the form of a truncated hollow cone. The end 24 of elastomeric element 14 is molded, bonded or otherwise secured to a rigid metal piston 28 and the end 26 is similarly connected to section 22 of peripheral wall 21.

Peripheral wall 21, elastomeric elements 12 and 14, and pistons 20 and 28 define an interior cavity 30 that is fluid tight. The partition wall 23 separates the cavity 30 into a pair of working chambers 31 and 32. The pistons 20 and 28 are rigidly connected together by an arm in the form of a hollow rod designated as tube 34 that is secured in a seat 35 in piston 20 and in a seat 36 in piston 28. The tube 34 extends through the working chambers 31 and 32 and through an opening 36 in partition wall 23. An annular seal 38 is carried in a groove of partition wall 23 within opening 36 and engages tube 34 providing a fluid seal between the working chambers 31 and 32 so that fluid cannot travel along the exterior of the tube 34 through the opening 36, whereas the tube 34 can move through the opening 36. The seal 38 allows the tube 34 to slide through the opening 36 as the pistons 20 and 28 move in concert.

Figure 2:
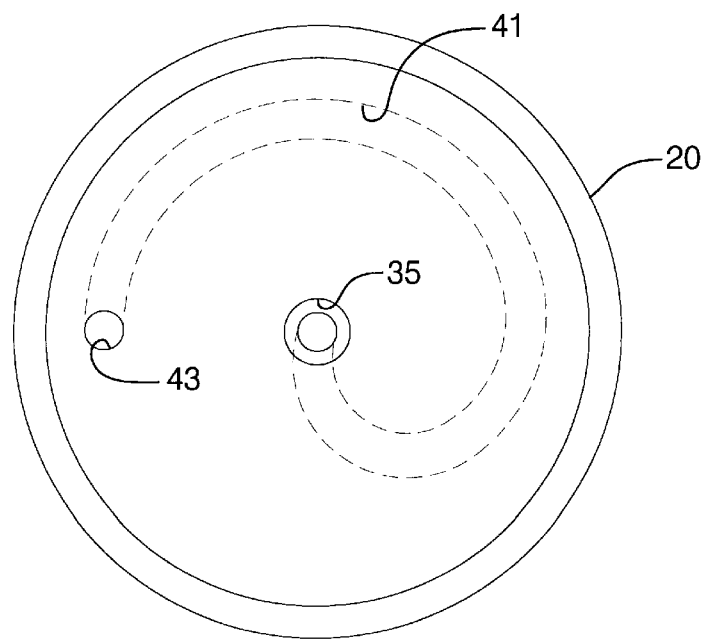
FIG. 2 is a detail plan view of a piston of the hydraulic mount of FIG. 1.

For the pistons 20 and 28 to move, the elastomeric elements 12 and 14 must deflect, and the fluid carried in the cavity 30 must be able to move between the working chambers 31 and 32. Therefore, a fluid track 40 is provided that forms a continuous opening between working chamber 31 and working chamber 32. Fluid track 40 substantially comprises: a spiraling bore 41 that is formed in piston 20; a spiraling bore 42 that is formed in piston 28; and the tube 34 that connects the bore 41 to the bore 42. In the present embodiment the fluid track 40 extends a distance around the piston 20 that covers approximately 360 degrees as seen in FIG. 2. The bore 41 opens to the working chamber 31 at port 43, and extends through the piston 20 moving to its center and registering with the tube 34 at seat 35. The length of the bore 41 is selected to provide operating characteristics that are determined by the application within which mount 10 will be utilized. The fluid track 40 similarly extends a distance around the piston 28. The bore 42 opens to the working chamber 32 at port 43, and extends through the piston 28 moving to its center and registering with the tube 34 at seat 36. The length of the bore 41 is selected to provide operating characteristics that are determined by the application within which mount 10 will be utilized.

The peripheral wall 21 is connected to a support 44 that supports the mount 10 and that substantially encloses a chamber 45 that is adjacent the elastomeric element 14 and is open to the atmosphere. The weight supported by the mount 10 for vibrational isolation, in this case vehicle engine 46, is connected to the piston 20. The weight is transferred through the mount 10 to the vehicle's structure 47, which is connected to support 44. With the static weight of the engine 46 placed on piston 20, transferring the load to the support 44 and to the vehicle structure 47, so that it is offset by a spring in the form of an individual load bearing pad in the present embodiment that is designated as elastomeric element 16. This relieves tensile stresses that would otherwise be placed upon the elastomeric element 14 due to the static weight of the engine 46. The elastomeric element 16 is tailored to the application providing individualized tuning for static rate, bulge rate, fore-aft rate, and lateral rate. In addition, by supporting the static weight on the elastomeric element 16, the working chambers 31 and 32 are pre-charged with a static pressure for performance enhancement without changing the load height of the mount 10. An advantage of applying a pre-charge is that cavitation otherwise produced during certain fluid flow conditions, can be avoided. Since the lower elastomeric element 14 is not placed in tension by the weight of the engine, the two elastomeric elements 12 and 14 can be identical, reducing manufacturing costs.

In response to vibratory inputs placed on the mount 10 by the engine, the elastomeric elements 12, 14 and 16 flex and upon the coordinated compression of working chamber 31 and expansion of working chamber 32, fluid is forced to move through the fluid track 40 from the working chamber 31 to the working chamber 32. The fluid enters the fluid track 40 at port 43, passes through bore 41, tube 34, bore 42 and exits at port 49. The characteristics of the elastomeric elements 12, 14 and 16 and the resistance of fluid movement through the fluid track 40 help to define the operational characteristics of the hydraulic mount 10. By changing the length and/or the cross-sectional area of the fluid track 40, the hydraulic mount 10 can be tuned or specific application uses. In general, the hydraulic mount 10 is tuned to reduce vibration transmission due to wheel hop inputs and to reduce the transmission of engine vibrations.

When the mount 10 operates to move fluid from the working chamber 31 to the working chamber 32, the pressure generated in working chamber 31 is positive and is equal in magnitude though opposite in sign to the negative pressure generated in working chamber 32. Therefore, the working chamber 31 pushes fluid through the fluid track 40 and the working chamber 32 operates in concert, assisting by pulling fluid through the fluid track 40. This duo-pumping action provides improved pumping efficiency, and to achieve a given pressure differential across the fluid track, each working chamber only needs to produce half the pressure level magnitude that a single working chamber mount needs to produce. Therefore, the pressures generated in the working chambers 31 and 32 are lower, reducing stresses on the bonded elastomeric elements. Lower operating pressures also reduce the likelihood of cavitation.

Figure 6:
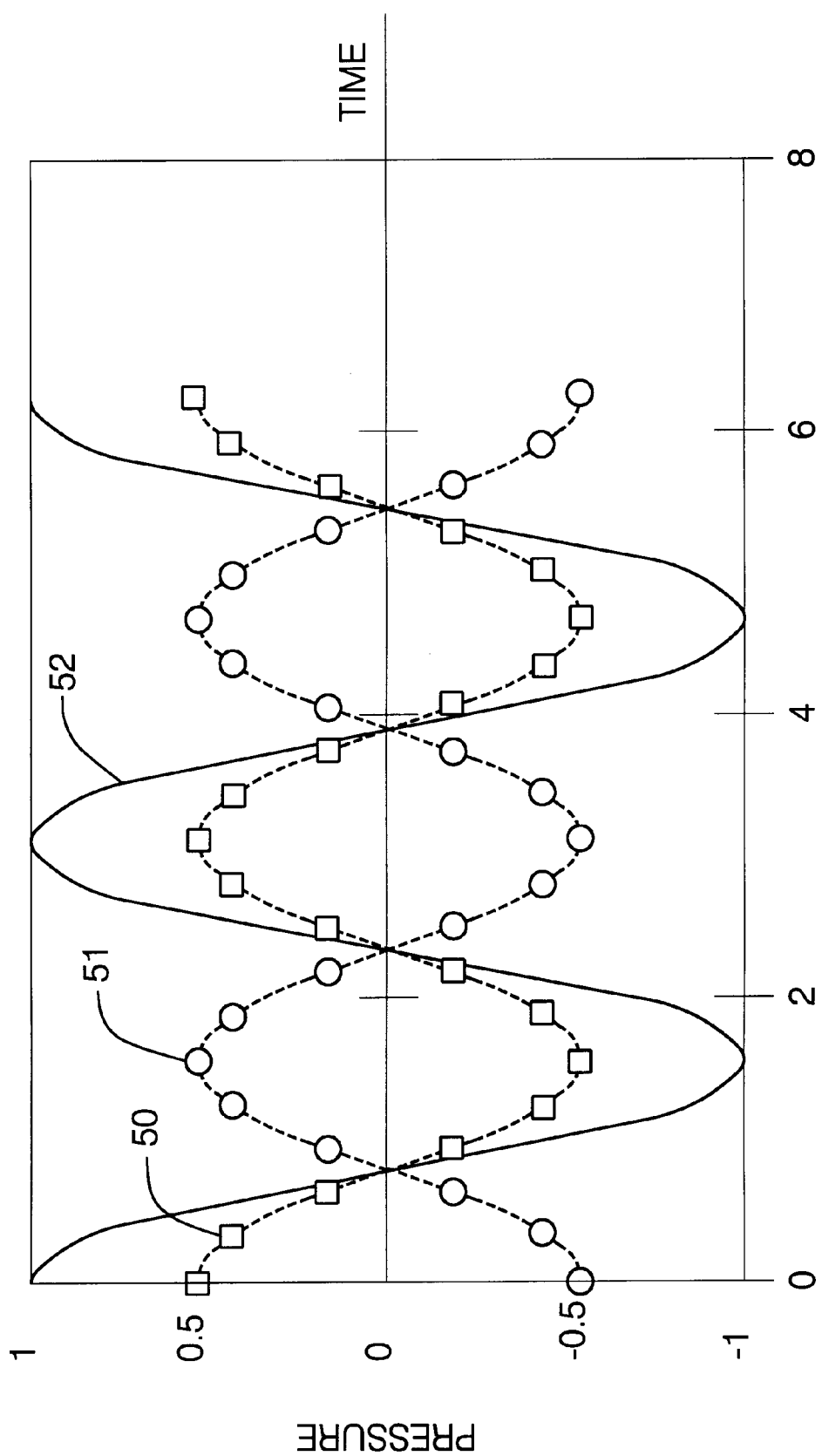
FIG. 6 is a graph illustrating the performance of various hydraulic mounts and shows working chamber pressure versus time.

When operation of the engine 46 and vehicle structure 47 causes the working chamber 32 to compress and the working chamber 31 to expand the operation of the mount 10 is in the opposite direction. Fluid flows out of the working chamber 32, through the port 49, bore 42, tube 34, bore 41 and out the port 43 into working chamber 31. Pressure generated in working chamber 32 is positive and is equal in magnitude though opposite in sign to the negative pressure generated in working chamber 31. As shown in FIG. 6, the simulated cyclic operation of the mount 10 is illustrated by pressure levels in the working chamber 31 as indicated by curve 50, and pressure level in the working chamber 32 as indicated by curve 51. In comparison, the pressure generated in a conventional single working chamber mount is illustrated by curve 52. To establish the same pressure differential cross the fluid track the conventional mount must generate twice the pressure magnitude within the chamber.

Figure 3:
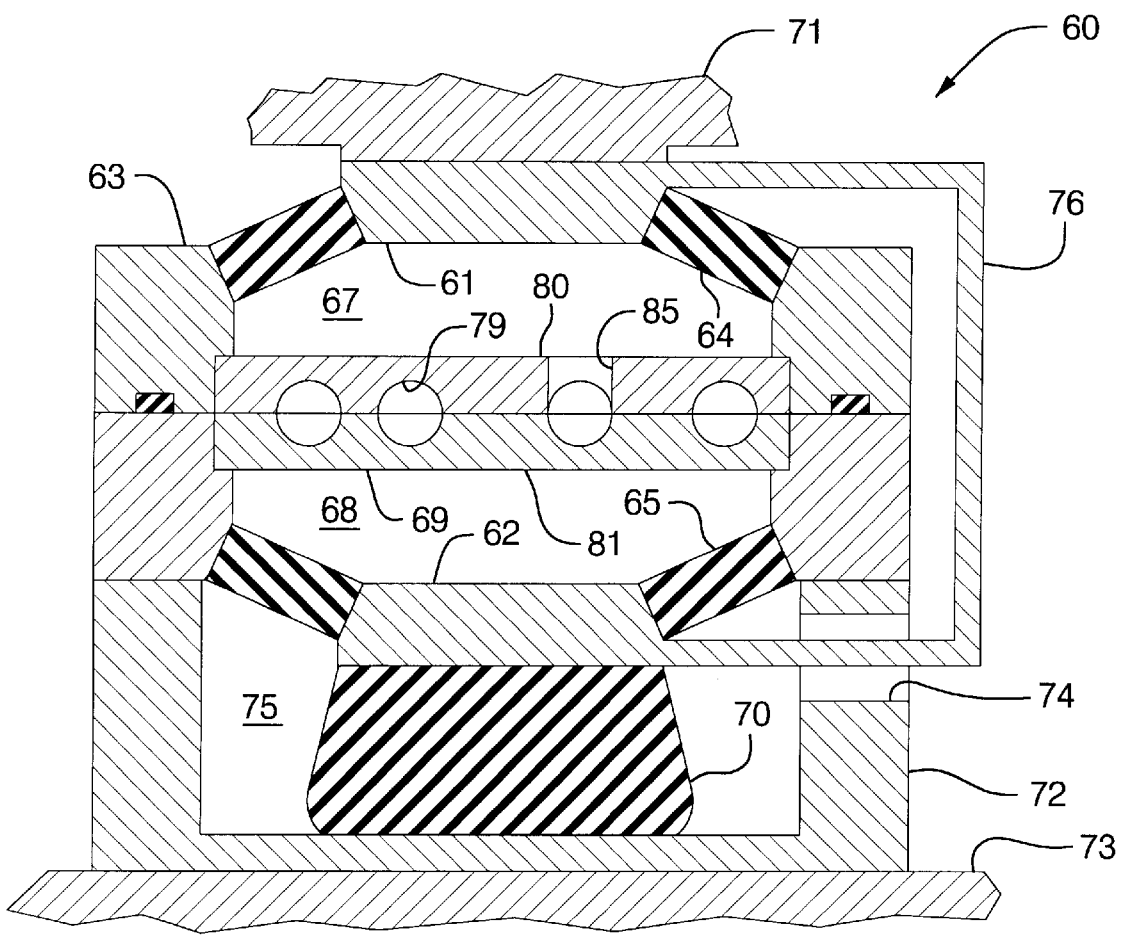
FIG. 3 is a schematic cross-sectional illustration of a hydraulic mount according to the present invention.

Referring to FIG. 3, an alternative embodiment of the present invention is illustrated. The mount 60 is substantially the same as the mount 10 and has dual pistons 61 and 62, each connected to a common peripheral wall 63 by elastomeric elements 64 and 65 respectively. Two working chambers 67 and 68 are defined on opposite sides of a partition wall 69. The piston 62 is supported on a spring in the form of an individual load bearing pad designated as elastomeric element 70. The elastomeric element 70 supports the static weight of the engine 71 on support 72 which transfers it to vehicle structure 73. The support 72 includes an opening 74 so that the chamber 75 is open to the atmosphere. The pistons 61 and 62 are rigidly connected together by an arm 76 that extends around the partition wall 69 and peripheral wall 63 and through the opening 74.

Figure 4:
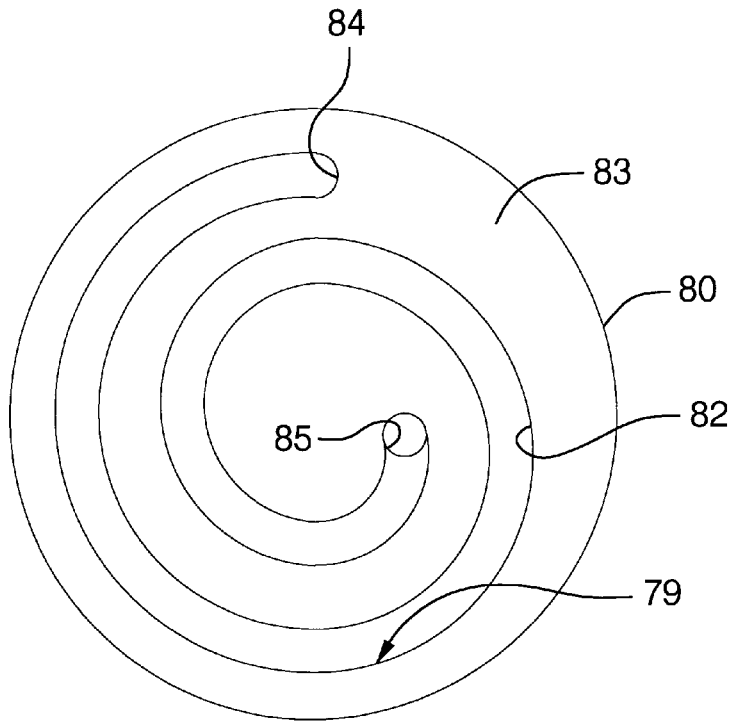
FIG. 4 is a detail plan view of a partition wall element of the hydraulic mount of FIG. 3.
Figure 5:
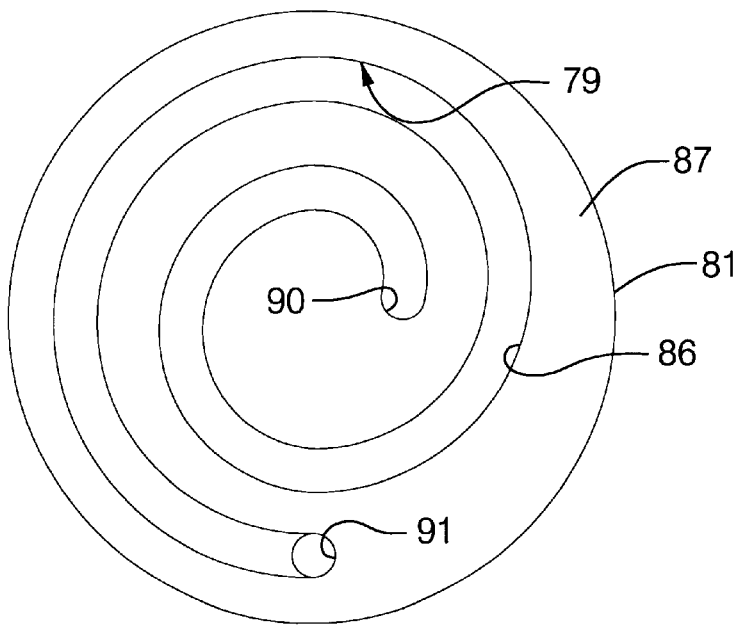
FIG. 5 is a detail plan view of a partition wall element of the hydraulic mount of FIG. 3.

The fluid track 79 is defined solely by a pair of plates 80 and 81 that are captured by the peripheral wall 63. As shown in FIG. 4, the plate 80 includes a trough 82 formed in surface 83 that terminates at end 84 and passes through the plate 80 at port 85. As shown in FIG. 5, the plate 81 includes a trough 86 in surface 87 that is substantially a mirror image of the trough 82 so that the two mate together to form the fluid track 79 when assembled as shown in FIG. 3. The trough 86 includes an end 90 that registers with the trough 82 at port 85 and includes a port 91 that extends through the plate 81 and registers with the trough 82 at end 84. The port 85 opens the fluid track 79 to the working chamber 67 and the port 91 opens the fluid track 79 to the working chamber 68. Operation of the mount 60 is substantially the same as operation of the mount 10 except that fluid travels between the working chambers 67 and 68 through the ports 85 and 91 and the fluid track 79 that is completely within the partition wall 81. As the pistons 61 and 62 move, the arm 76 can move within the opening 74.

Thus, hydraulic mount durability is improved by reducing internal pressures and by distributing kinetic loads to three rubber elements so that individual stresses are minimized. Duo-pumping action and an individual load bearing element for supporting static loads on the mount are used.

We claim:

1. A hydraulic mount comprising:
   a first piston;
   a wall, with a first working chamber defined between the first piston and the wall, wherein the first piston is supported by a first elastomeric element so that the first working chamber is enclosed wherein the size of the first working chamber varies as the first elastomeric element is compressed and expanded by operation of the first piston and the wall moving closer together and farther apart;
   a second piston, with a second working chamber defined between the second piston and the wall, wherein the second piston is supported by a second elastomeric element so that the second working chamber is enclosed wherein the size of the second working chamber varies as the second elastomeric element is compressed and expanded by operation of the second piston and the wall moving closer together and farther apart;
   a fluid track extending through the wall and opening between the first working chamber and the second working chamber wherein a fluid is contained in the first working chamber, the second working chamber and the fluid track;
   a support engaging the wall; and
   a load bearing element extending between the second piston and the support wherein the load bearing element supports the first piston and the second piston on the support so that the first resilient element and the second resilient element do not support a static load that is placed on the hydraulic mount.

2. A hydraulic mount according to claim 1 wherein when the first working chamber is compressed the second working chamber is expanded and a first pressure level is established in the first working chamber and a second pressure level is established in the second chamber wherein the first and second pressure levels are substantially equal in magnitude and opposite in sign wherein the first and second pressure levels cooperate in moving the fluid through the fluid track.

3. A hydraulic mount for supporting an engine on a vehicle structure comprising:
   a first piston engaging and supporting the engine;
   a wall, with a first working chamber defined between the first piston and the wall, wherein the first piston is supported by a first elastomeric element so that the first working chamber is enclosed wherein the size of the first working chamber varies as the first elastomeric element is compressed and expanded by operation of the first piston and the wall moving closer together and farther apart;
   a second piston, with a second working chamber defined between the second piston and the wall, wherein the second piston is supported by a second elastomeric element so that the second working chamber is enclosed wherein the size of the second working chamber varies as the second elastomeric element is compressed and expanded by operation of the second piston and the wall moving closer together and farther apart;
   a fluid track extending through the wall and opening between the first working chamber and the second working chamber wherein a fluid is contained in the first working chamber, the second working chamber and the fluid track;
   a support engaging the wall and engaging the vehicle structure to support the engine on the vehicle structure; and
   a load bearing element extending between the second piston and the support wherein the load bearing element supports the first piston and the second piston on the support so that the first resilient element and the second resilient element do not support a static load that is placed on the hydraulic mount by the engine.

4. A hydraulic mount according to claim 3 further comprising a rigid arm connecting the first piston to the second piston.

5. A hydraulic mount according to claim 4 wherein the rigid arm passes through the wall.

6. A hydraulic mount according to claim 5 wherein the rigid arm extends through the support.

7. A hydraulic mount according to claim 4 wherein the wall includes a first plate having a first surface with a first trough that registers with a first opening through the first plate wherein the first trough extends around the first surface and wherein the wall includes a second plate having a second surface with a second trough that registers with a second opening through the second plate wherein the second trough extends around the second surface and registers with the first trough so that the fluid track is defined between the first opening and the second opening by the first trough and the second trough and wherein the hydraulic mount is tuned by varying the size of the fluid track.

8. A hydraulic mount according to claim 5 wherein the rigid arm comprises a hollow tube and extends between the first piston and the second piston wherein the fluid track is defined through the first piston, the tube and the second piston.

9. A hydraulic mount comprising:
   a first piston;
   a partition wall, with a first working chamber defined between the first piston and the partition wall;
   a peripheral wall rigidly engaging the partition, wherein the first piston is supported on the peripheral wall by a first elastomeric element so that the first working chamber is enclosed wherein the size of the first working chamber varies as the first elastomeric element is compressed and expanded by operation of the first piston and the wall moving closer together and farther apart;

a second piston, with a second working chamber defined between the second piston and the wall, wherein the second piston is supported on the peripheral wall by a second elastomeric element so that the second working chamber is enclosed wherein the size of the second working chamber varies as the second elastomeric element is compressed and expanded by operation of the second piston and the wall moving closer together and farther apart;

a fluid track extending through the wall and opening between the first working chamber and the second working chamber wherein a fluid is contained in the first working chamber, the second working chamber and the fluid track;

a support engaging the wall; and a load bearing element extending between the second piston and the support wherein the load bearing element supports the first piston and the second piston on the support so that the first resilient element and the second resilient element do not support a static load that is placed on the hydraulic mount.

10. A hydraulic mount according to claim 9 wherein the rigid arm extends through the wall.

11. A hydraulic mount according to claim 9 wherein the rigid arm extends around the wall and through the support.

* * * * *